United States Patent
Nomura et al.

(10) Patent No.: US 12,025,464 B2
(45) Date of Patent: Jul. 2, 2024

(54) PROBE DATA EVALUATION APPARATUS, AND STORAGE MEDIUM STORING PROBE DATA EVALUATION PROGRAM PRODUCT

(71) Applicant: DENSO CORPORATION, Kariya (JP)

(72) Inventors: Toshio Nomura, Kariya (JP); Shigehiro Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 525 days.

(21) Appl. No.: 17/223,356

(22) Filed: Apr. 6, 2021

(65) Prior Publication Data

US 2021/0247204 A1    Aug. 12, 2021

Related U.S. Application Data

(63) Continuation of application No. PCT/JP2019/045633, filed on Nov. 21, 2019.

(30) Foreign Application Priority Data

Dec. 7, 2018    (JP) .............................. 2018-230009

(51) Int. Cl.
*G01C 21/00*    (2006.01)
*H04W 4/40*    (2018.01)

(52) U.S. Cl.
CPC ....... *G01C 21/387* (2020.08); *G01C 21/3822* (2020.08); *G01C 21/3833* (2020.08); *G01C 21/3841* (2020.08); *H04W 4/40* (2018.02)

(58) Field of Classification Search
CPC .............. G01C 21/387; G01C 21/3822; G01C 21/3833; G01C 21/3841; G01C 21/3819; G01C 21/3844; H04W 4/40; H04W 4/025; H04W 4/029; H04W 4/38; H04W 4/44; G08G 1/0969; G09B 29/00
See application file for complete search history.

(56) References Cited

U.S. PATENT DOCUMENTS

| | | | |
|---|---|---|---|
| 2012/0173185 A1* | 7/2012 | Taylor | G01S 7/4004 356/243.1 |
| 2013/0085659 A1 | 4/2013 | Bekaert | |
| 2018/0023961 A1 | 1/2018 | Fridman | |
| 2019/0346572 A1* | 11/2019 | Fowe | G01S 19/06 |
| 2020/0104290 A1* | 4/2020 | Sakaguchi | G06F 16/2358 |
| 2021/0033406 A1* | 2/2021 | Watanabe | G09B 29/003 |
| 2021/0094581 A1* | 4/2021 | Lee | B60W 50/0205 |
| 2022/0234581 A1* | 7/2022 | Kim | B60W 10/18 |

FOREIGN PATENT DOCUMENTS

JP    2013534621 A    9/2013

* cited by examiner

*Primary Examiner* — Jess Whittington
*Assistant Examiner* — Brian E Yang
(74) *Attorney, Agent, or Firm* — Harness, Dickey & Pierce, P.L.C.

(57) ABSTRACT

In a probe data evaluation apparatus, probe data are collected from a vehicle. Provisional map data are generated based on the collected probe data. The generated provisional map data are compared with reference map data, to provide a comparison result. Whether or not to adopt the collected probe data is determined based on the comparison result.

8 Claims, 4 Drawing Sheets

PROBE DATA EVALUATION APPARATUS, AND STORAGE MEDIUM STORING PROBE DATA EVALUATION PROGRAM PRODUCT

CROSS REFERENCE TO RELATED APPLICATIONS

The present application is a continuation application of International Patent Application No. PCT/JP2019/045633 filed on Nov. 21, 2019, which designated the U.S. and claims the benefit of priority from Japanese Patent Application No. 2018-230009 filed on Dec. 7, 2018. The entire disclosures of all of the above applications are incorporated herein by reference.

TECHNICAL FIELD

The present disclosure relates to a probe data evaluation apparatus and a storage medium storing a probe data evaluation program product.

BACKGROUND

There is a technique for generating map data based on a large number of probe data collected from a plurality of vehicles. For example, map data may be generated by performing a process such as average conversion on a large number of collected probe data.

SUMMARY

According to an example of the present disclosure, a probe data evaluation apparatus is provided as follows. In the probe data evaluation apparatus, probe data are collected from a vehicle. Provisional map data are generated based on the collected probe data. The generated provisional map data are compared with reference map data, to provide a comparison result. Whether or not to adopt the collected probe data is determined based on the comparison result.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
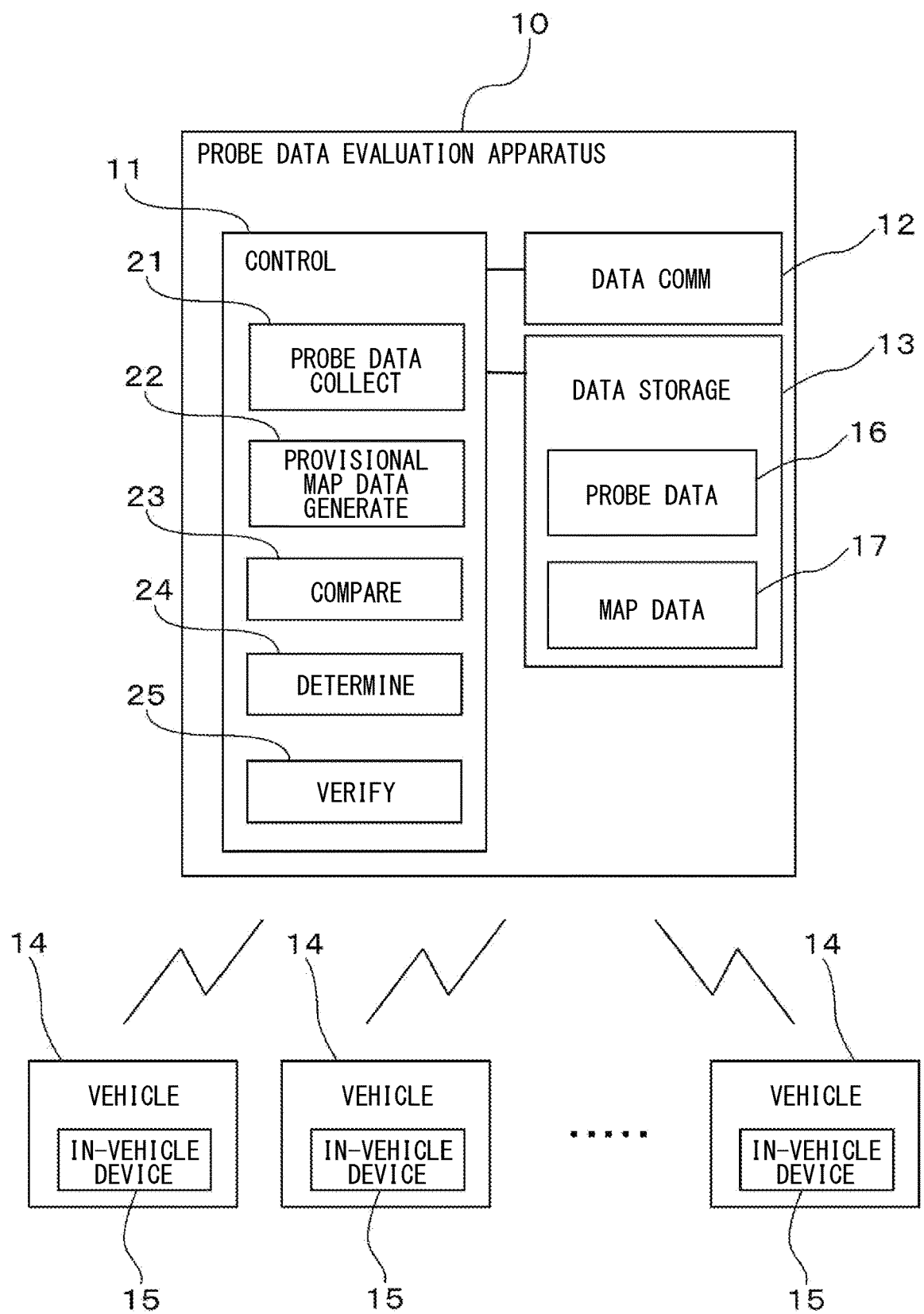
FIG. 1 is a diagram schematically showing a configuration example of a probe data evaluation apparatus according to the present embodiment.

Hereinafter, an embodiment relating to a probe data evaluation apparatus will be described with reference to the drawings. A probe data evaluation apparatus 10 illustrated in FIG. 1 is provided in, for example, a center server for generating map data, and mainly includes a controller circuit 11. The controller circuit 11 is configured to be a server computer having high processing performance, and controls the overall operation of the probe data evaluation apparatus 10 according to a control program (i.e., a control program product). This control program includes a probe data evaluation program.

The controller circuit 11 is connected with a data communication unit 12 and a data storage 13 via an internal communication link, as in FIG. 1. The data communication unit 12, which may also be referred to as a transceiver 12, includes, for example, a communication module having a communication antenna (not shown), and is configured to enable data communication with in-vehicle devices 15 mounted on a plurality of vehicles 14. The vehicle 14 is mounted with an in-vehicle camera (not shown) that images the periphery of the vehicle 14, a current position estimation unit (not shown) that estimates the current position of the vehicle 14, a traveling state detection unit (not shown) that detects the traveling state of the vehicle 14, and the like.

The in-vehicle camera is configured to be able to image the periphery of the vehicle 14, in this case, at least a front area in front of the vehicle 14 in the traveling direction. The mounting position and the number of in-vehicle cameras in the vehicle 14 can be appropriately changed.

The current position estimation unit includes, for example, a positioning antenna (not shown) such as a GPS antenna (GPS: Global Positioning System), an acceleration sensor, a vehicle speed sensor, and the like. The current position estimation unit is configured to be able to estimate the current position of the vehicle 14 based on various information such as satellite signals received from the positioning satellites via the positioning antenna.

The traveling state detection unit includes, for example, a speed sensor that detects the traveling speed of the vehicle 14, an acceleration sensor that detects the acceleration of the vehicle 14, a rotation sensor that detects the rotation of the vehicle 14, and a weather sensor that detects weather conditions such as rainfall and snowfall based on the driving status of the wiper. Further, the in-vehicle device 15 can specify the traveling state of the vehicle 14, for example, the presence or absence of rainfall or snowfall, the condition of the traveling road surface, and the like by performing a well-known image analysis process on the image obtained by the in-vehicle camera. That is, the in-vehicle camera also functions as an example of the traveling state detection unit.

Further, the in-vehicle device 15 can identify an object such as a lane, a sign, or a landmark existing around the vehicle 14 by performing a well-known image analysis process on the image obtained by the in-vehicle camera. The in-vehicle device 15 can generate probe data indicating an object specified from an image, and transmit the generated probe data to the probe data evaluation apparatus 10 via a data communication unit (not shown). The controller circuit 11 in the probe data evaluation apparatus 10 can generate map data by synthesizing a large number of probe data collected from the in-vehicle device 15 as a data source.

Further, the in-vehicle device 15 can include the current position data indicating the current position of the vehicle 14 estimated by the current position estimation unit in the probe data. The controller circuit 11 in the probe data evaluation apparatus 10 can specify the position to which the probe data corresponds, based on the current position data included in the probe data collected from the in-vehicle device 15.

Further, the in-vehicle device 15 can include the traveling state data indicating the traveling state of the vehicle 14 estimated by the traveling state detection unit in the probe data. The controller circuit 11 in the probe data evaluation apparatus 10 can specify the traveling state of the vehicle 14 at the time when the probe data are generated, for example, the traveling speed, acceleration, rotation angle, surrounding weather condition, traveling road surface condition of the vehicle 14, based on the traveling condition data included in the probe data collected from the in-vehicle device 15.

The data storage 13, which is configured to include, for example, a large-capacity storage medium, is provided with a probe data storage 16 and a map data storage 17. The probe data storage 16 is a storage for accumulating probe data collected from a plurality of vehicles 14. The map data storage 17 is a storage for storing map data generated based on a large number of probe data collected from a plurality of vehicles 14.

Further, the probe data evaluation apparatus 10 executes a control program, particularly a probe data evaluation program, by the controller circuit 11, to implement various processing units or modules virtually by software, such as a probe data collection unit 21, a provisional map data generation unit 22, a comparison unit 23, a determination unit 24, and a verification unit 25. Note that those processing units or modules may be implemented by hardware, or by a combination of software and hardware.

The probe data collection unit 21 executes a probe data collection process. The probe data collection process is a process of collecting probe data from the in-vehicle devices 15 of a plurality of vehicles 14 via the data communication unit 12.

The provisional map data generation unit 22 executes a provisional map data generation process. The provisional map data generation process is a process of generating provisional map data D1 based on a large number of probe data collected by the probe data collection process executed by the probe data collection unit 21. In this case, the provisional map data generation unit 22 can generate the provisional map data D1 by performing processing such as synthesis, editing, combining, and conversion on a large number of collected probe data.

The comparison unit 23 executes a comparison process. The comparison process is a process of comparing the provisional map data D1 generated by the provisional map data generation process executed by the provisional map data generation unit 22 with the reference map data D2. The reference map data D2 may be set as the most accurate map data among a plurality of map data stored in the map data storage 17. For example, the controller circuit 11 can set the map data that most recently "passed" in the verification process described later as the reference map data D2 among the plurality of map data stored in the map data storage 17. Further, the controller circuit 11 can set, for example, the map data designated by the administrator as the reference map data D2 among the plurality of map data stored in the map data storage 17. Further, the controller circuit 11 can set the accuracy of a plurality of map data stored in the map data storage 17 to be ranked. For example, it is possible to set higher accuracy for map data that has most recently "passed" the verification process described later, and lower accuracy for map data that has passed the verification process described later for a longer period of time.

The determination unit 24 executes a determination process. The determination process is a process of determining whether or not to adopt the probe data collected by the probe data collection unit 21 based on the comparison result by the comparison unit 23.

The verification unit 25 executes a verification process. The verification process is a process for verifying the traveling of the vehicle 14 based on the provisional map data D1 when the determination unit 24 has made an affirmative determination, that is, when it has been determined that "probe data are adopted". Specifically, in this verification process, for example, the controller circuit 11 simulates the traveling of the vehicle 14 based on the provisional map data D1. As a result of the simulation, if there is no defect, it is "passed", and if there is a defect, it is "failed". As a result of the verification process, the provisional map data D1 that are "passed" are stored in the map data storage 17 as the main map data. Then, the main map data stored in the map data storage 17 can be distributed to the in-vehicle device 15 of the vehicle 14. On the other hand, the provisional map data D1 that are "failed" as a result of the verification process is, for example, discarded without being promoted to the main map data.

The verification process may be executed by the in-vehicle device 15 on the vehicle 14 instead of the controller circuit 11 in the probe data evaluation apparatus 10. Specifically, at least one vehicle 14 of the plurality of vehicles 14 is registered in advance as a verification vehicle. Then, the verification unit 25 distributes the provisional map data D1 to the in-vehicle device 15 in the verification vehicle. Then, the in-vehicle device 15 that has received the provisional map data D1 simulates the traveling of the vehicle 14 based on the provisional map data D1 and determines whether or not the provisional map data D1 has passed. Then, the in-vehicle device 15 notifies the verification unit 25 of the determination result. Then, the controller circuit 11 in the probe data evaluation apparatus 10 determines whether or not to promote the provisional map data D1 to the main map data based on the determination result received from the in-vehicle device 15. Further, the verification process may be executed by both the controller circuit 11 in the probe data evaluation apparatus 10 and the in-vehicle device 15, and the verification results of both are comprehensively determined. It may thereby be determined whether or not the provisional map data D1 are promoted to the main map data.

Further, the in-vehicle device 15 in the verification vehicle may be provided with a test mode for determining the pass/fail of the provisional map data D1 to encourage the driver of the verification vehicle to actually drive based on the provisional map data D1. That is, the in-vehicle device 15 in the verification vehicle may determine the pass/fail of the provisional map data D1 based on the result of actual traveling based on the provisional map data D1. Here, the verification process in this test mode involves an actual travel based on the provisional map data D1 whose accuracy is not guaranteed. Therefore, the vehicle 14 to be registered as a verification vehicle is preferably limited to, for example, a vehicle 14 of a driver trained in test driving or a vehicle 14 of a skilled driver having abundant driving experience.

Figure 2:
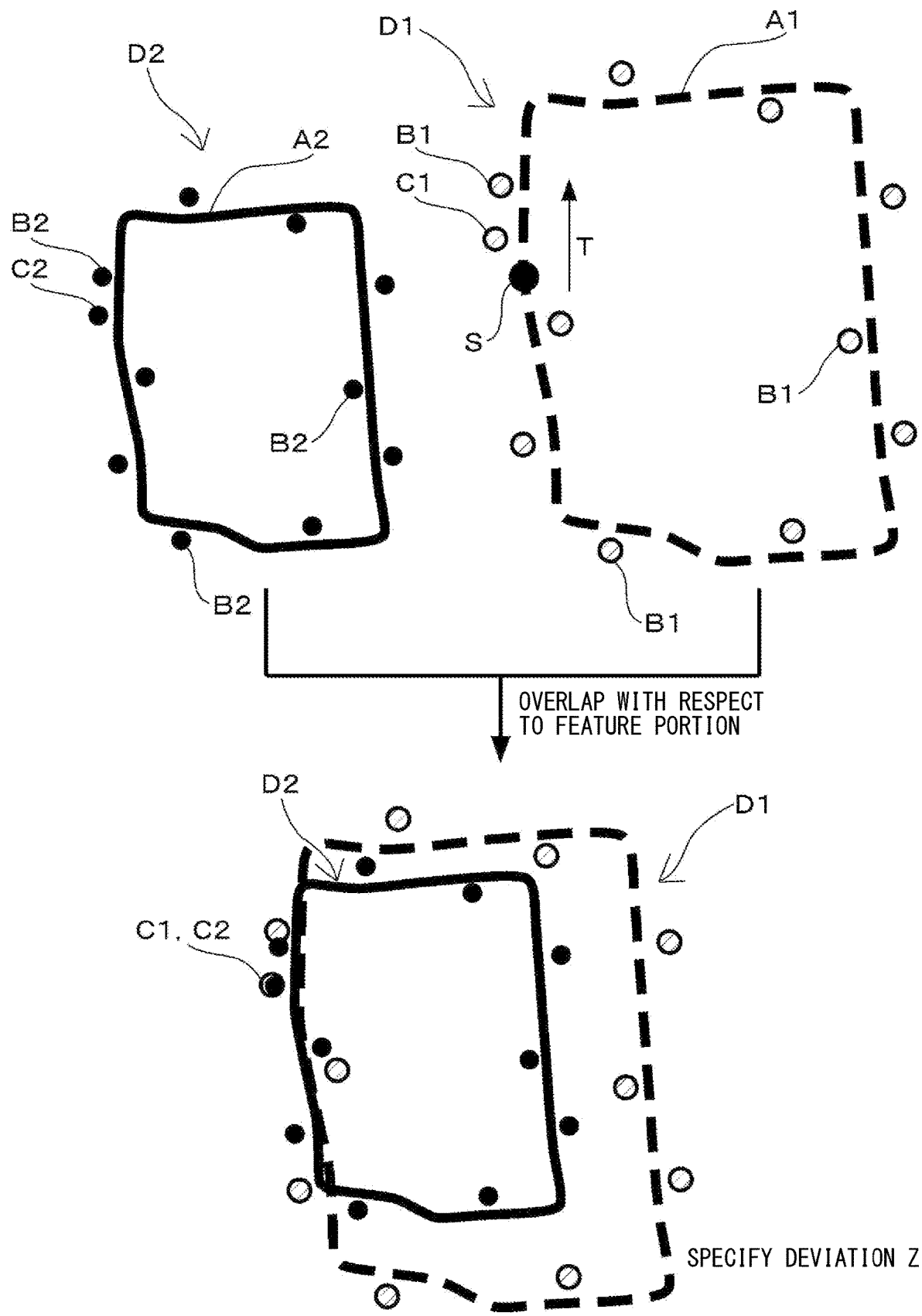
FIG. 2 is a diagram schematically showing an example of a method of comparing the provisional map data and the reference map data according to the present embodiment.

Next, an example of the comparison process by the comparison unit 23 and the determination process by the determination unit 24 will be described in more detail. As illustrated in FIG. 2, the provisional map data D1 includes the information indicating a road A1 generated based on a large number of collected probe data, and an object B1 such as a sign and landmark that exists around the road A1. In addition, the reference map data D2 include the information indicating a road A2, whose position and shape are reproduced with high accuracy, and an object B2, whose position with respect to the road A2 is reproduced with high accuracy. In FIG. 2, for convenience of explanation, the size of the provisional map data D1 and the size of the reference map data D2 are shown to be significantly different from each other. In actual control, the size of the provisional map data D1 and the size of the reference map data D2 are almost the same in most cases.

When the comparison process is started, the comparison unit 23 first specifies the feature portion included in the provisional map data D1 as the feature portion. In this case, the comparison unit 23 sets an optional point on the road A1 as the starting point S, and sets a traveling direction T from the starting point S. Then, the comparison unit 23 sets the object B1 that exists closest to the start point S in the traveling direction T as the feature portion C1. Then, the comparison unit 23 sets a portion corresponding to the feature portion C1 of the provisional map data D1 as the feature portion C2 in the reference map data D2.

The comparison unit 23 may set a portion of the road A1 included in the provisional map data D1 that shows a characteristic shape other than a straight line, such as a curve point, a meandering point, or an intersection, as a feature portion. Further, the comparison unit 23 may set an optional point existing in the provisional map data D1 as a feature portion, or may set an optional range in the provisional map data D1 as a feature portion.

The comparison unit 23 sets the feature portion C1 for the provisional map data D1 and the feature portion C2 for the reference map data D2. The comparison unit 23 then overlaps the provisional map data D1 and the reference map data D2 with reference to these feature portions C1 and C2. That is, the comparison unit 23 overlaps the feature portion C1 included in the provisional map data D1 on the feature portion C2 included in the reference map data D2. Then, the comparison unit 23 compares the size and shape of both data D1 and D2 in a state where the provisional map data D1 and the reference map data D2 are overlapped with respect to the feature portions C1 and C2. The deviation amount Z between the provisional map data D1 and the reference map data D2 is thereby specified.

At this time, the comparison unit 23 may specify the total deviation amount Z by totaling the deviation amounts of the provisional map data D1 and the reference map data D2. That is, the comparison unit 23 may specify, for example, the average value of the deviation amounts of the provisional map data D1 and the reference map data D2 as the total deviation amount Z. The maximum value or the minimum value of the deviation amount of each portion may be specified as the total deviation amount Z. Further, the comparison unit 23 may specify the deviation amount of one or a plurality of specific parts of the overlapped data D1 and D2, for example, one place or a plurality of places within a predetermined distance from the feature portions C1 and C2, as the total deviation amount Z. In short, various methods can be adopted as long as the method can specify the total deviation amount Z between the provisional map data D1 and the reference map data D2.

Based on the comparison result by the comparison unit 23, the determination unit 24 determines whether or not to adopt the provisional map data D1 (i.e., the probe data forming the provisional map data D1). In this case, the determination unit 24 compares the deviation amount Z specified by the comparison unit 23 with a predetermined reference amount K. Then, when the deviation amount Z is within the reference amount K, the determination unit 24 makes an affirmative determination, that is, determining to adopt the probe data forming the provisional map data D1. Further, when the deviation amount Z exceeds the reference amount K, the determination unit 24 makes a negative determination, that is, determining not to adopt the probe data forming the provisional map data D1. The predetermined reference amount K may be appropriately changed and set according to, for example, the required reliability of the probe data or the required accuracy of the map data.

Figure 3:
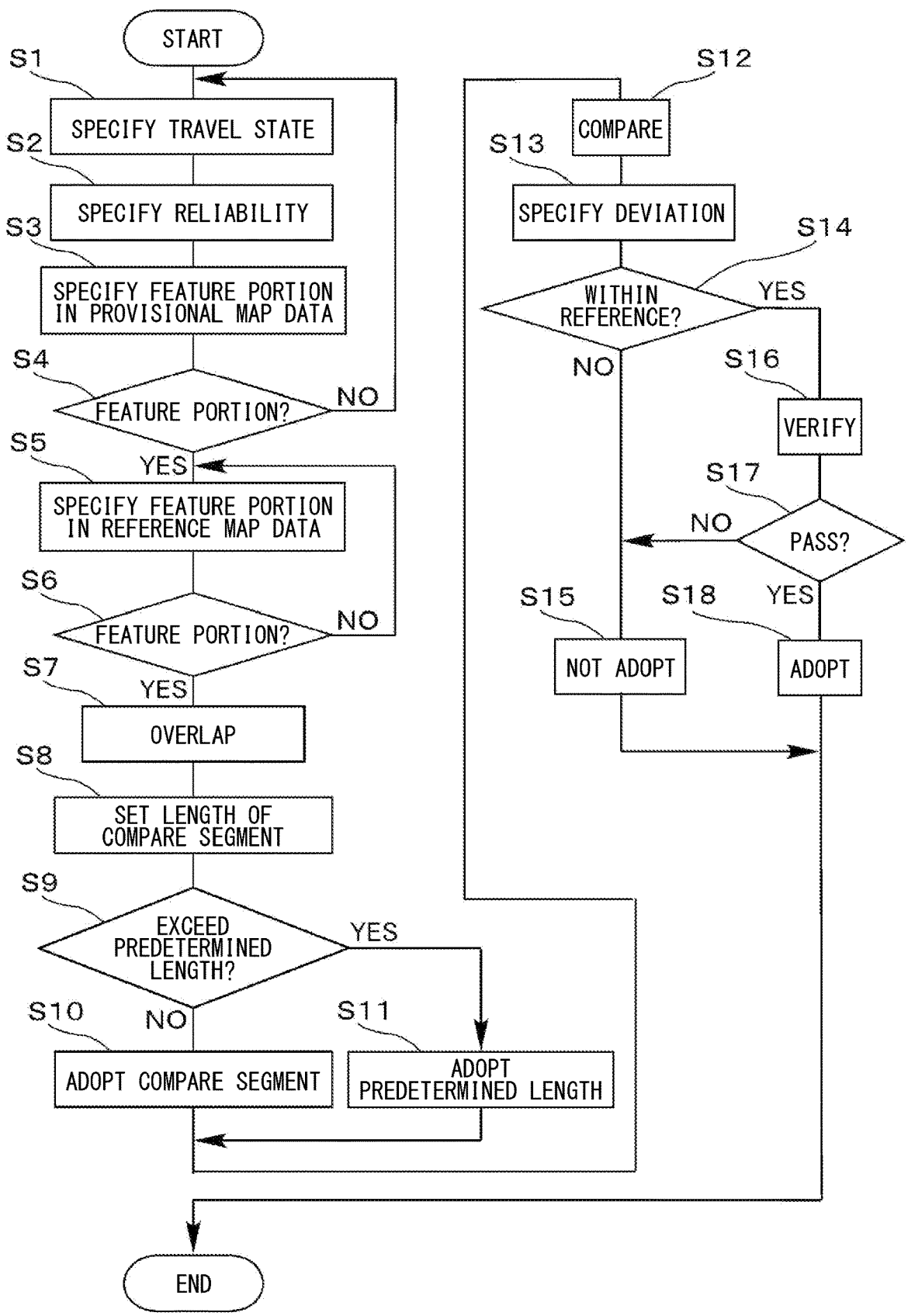
FIG. 3 is a flowchart schematically showing an operation example of the probe data evaluation apparatus according to the present embodiment.

Next, an example of control related to the probe data evaluation process by the probe data evaluation apparatus 10 will be described. As illustrated in FIG. 3, the controller circuit 11 in the probe data evaluation apparatus 10 generates provisional map data D1 based on a large number of probe data collected from a plurality of vehicles 14, and specifies the traveling state of the vehicle 14 at the time when the probe data are generated based on a large number of collected probe data, that is, the traveling state data included in the probe data that generated the provisional map data D1 (S1). Then, the controller circuit 11 sets the reliability of the probe data based on the traveling state of the specified vehicle 14 (S2).

The reliability of probe data is an index showing the degree of accuracy of the probe data. The controller circuit 11 sets the reliability of the probe data obtained when the traveling condition of the vehicle 14 is bad to be low, and sets the reliability of the probe data obtained when the traveling condition of the vehicle 14 is good to be high. The bad traveling condition of the vehicle 14 is, for example, the case when the speed of the vehicle 14 is faster than a predetermined speed, the case when rainfall or snowfall is observed as a result of image processing, or the case when snow is observed on the road, or at night. On the other hand, the good traveling condition is, for example, the case when the speed of the vehicle 14 is slower than a predetermined speed, the case when no rainfall or snowfall is observed as a result of image processing, the case when no snowfall is observed on the road, or at daytime.

When the reliability of the probe data is set, the controller circuit 11 specifies the feature portion included in the generated provisional map data D1 (S3). At this time, the controller circuit 11 may be configured to change the number (i.e., a counted number) of the feature portions to be specified according to the reliability of the probe data specified in step S2. That is, the controller circuit 11 may increase the number of feature portions to be specified as the reliability of the probe data is lower than a predetermined reference reliability, and decrease the number of feature portions to be specified as the reliability of the probe data is higher than the predetermined reference reliability. The value of the predetermined reference reliability may be appropriately changed and set.

When the provisional map data D1 do not include a remarkable feature portion (S4: NO), the provisional map data D1 are discarded and the process proceeds to step S1. For example, if there are no objects such as signs or landmarks in the provisional map data D1, or if there are no characteristic road shapes such as curves, meanders, or intersections, it is determined that the provisional map data D1 do not include a remarkable feature portion (S4: NO). Then, the controller circuit 11 executes the processes of steps S1 to S3 for another provisional map data D1 and executes the process of specifying the feature portion. That is, the controller circuit 11 generates provisional map data D1, based on the probe data collected at that time, at any time, for example, every time a predetermined number of probe data are collected. Then, the controller circuit 11 is configured to execute processing from step S1 on each of the generated provisional map data D1.

When the controller circuit 11 can specify the feature portion for the provisional map data D1 (S4: YES), the controller circuit 11 also sets the feature portion for the reference map data D2 (S5). That is, the controller circuit 11 searches for whether or not a portion corresponding to the feature portion of the provisional map data D1 is included in the reference map data D2; if it is included, the portion is set as a feature portion included in the reference map data D2.

When the reference map data D2 do not include the feature portion corresponding to the feature portion of the provisional map data D1 (S6: NO), the controller circuit 11 sets another map data stored in the map data storage 17 as new reference map data D2. The specifying process for the feature portion is executed for the new reference map data D2. At this time, the controller circuit 11 sets the map data with the next highest accuracy as the new reference map data D2. The map data with the next highest accuracy are next to the map data in which the feature portion corresponding to the feature portion of the provisional map data D1 is not included, of the plurality of map data stored in the map data storage 17.

When the controller circuit 11 can specify the feature portion for the reference map data D2 (S6: YES), the controller circuit 11 overlaps the feature portion of the provisional map data D1 and the feature portion of the reference map data D2 (S7). Suppose a case that a plurality of feature portions are set for the provisional map data D1, and a plurality of corresponding feature portions are set for the reference map data D2. In such a case, the controller circuit 11 overlaps the plurality of feature portions of the provisional map data D1 on the plurality of feature portions of the reference map data D2. Then, the controller circuit 11 sets the length of the comparison segment W for comparing the provisional map data D1 and the reference map data D2 according to the reliability of the probe data specified in step S2 (S8).

Figure 4:
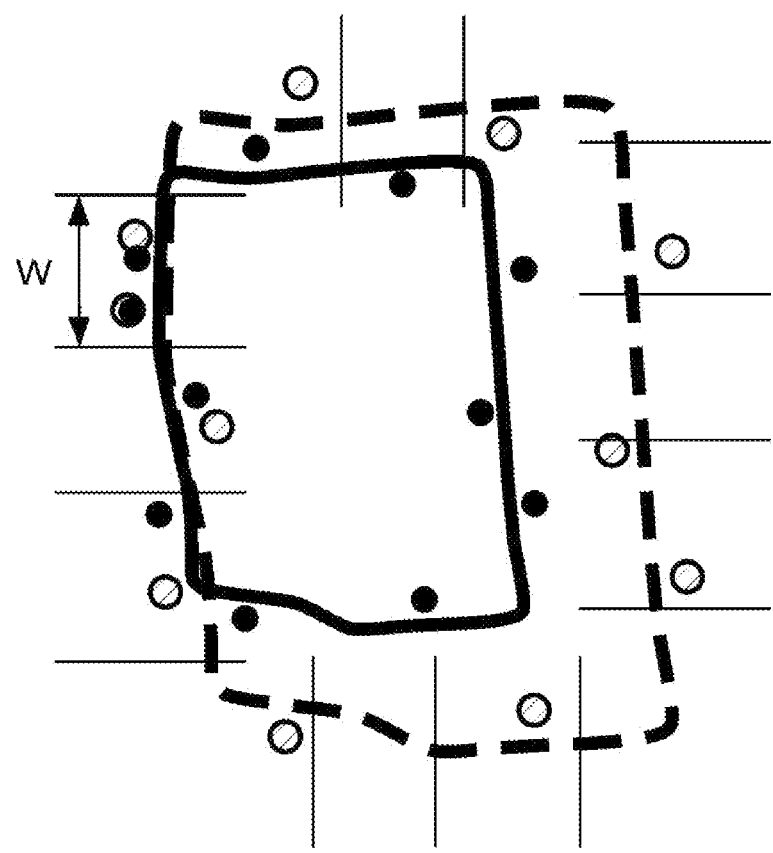
FIG. 4 is a diagram schematically showing a setting example of a comparison segment according to the present embodiment.

That is, as illustrated in FIG. 4, the controller circuit 11 is configured to divide the provisional map data D1 and the reference map data D2 into a plurality of comparison segments W (i.e., comparison road segments). Then, when the reliability of the probe data is lower than the predetermined reference reliability, the controller circuit 11 sets the length of the comparison segment W short. At this time, the controller circuit 11 sets the length of the comparison segment W shorter as the difference between the reliabilities of the probe data and the reference reliability is larger. Further, when the reliability of the probe data is higher than the predetermined reference reliability, the controller circuit 11 sets the length of the comparison segment W to be longer. At this time, the controller circuit 11 sets the length of the comparison segment W longer as the difference between the reliability of the probe data and the reference reliability is larger. The value of the reference reliability in step S8 can also be changed and set as appropriate.

Then, the controller circuit 11 determines whether or not the set comparison segment W exceeds a predetermined length L (S9). In this case, for example, 500 m is set as the predetermined length L. The predetermined length L may be appropriately changed and set according to the required accuracy of the map data and the like. When the set comparison segment W does not exceed the predetermined length L (S9: NO), the controller circuit 11 adopts the comparison segment W as the comparison segment W used for the subsequent comparison process (S10). On the other hand, when the set comparison segment W exceeds the predetermined length L (S9: YES), the controller circuit 11 adopts the predetermined length L as the comparison segment W to be used for the subsequent comparison process (S11).

Then, when the controller circuit 11 sets the length of the comparison segment W based on the reliability of the probe data, both data D1 and D2 are compared for each comparison segment W in a state where the provisional map data D1 and the reference map data D2 are overlapped with respect to the feature portion (S12). Then, the controller circuit 11 specifies the total deviation amount Z between the provisional map data D1 and the reference map data D2 based on the result of this comparison process (S13). In this case, the controller circuit 11 divides the provisional map data D1 and the reference map data D2 for each comparison segment W and compares them. Therefore, the controller circuit 11 may be configured to first specify the deviation amount for each comparison segment W, and then to specify the total deviation amount Z by totaling the deviation amounts in the respective comparison segments W. Thereby, the deviation amount Z can be specified with higher accuracy.

When the controller circuit 11 specifies the deviation amount Z between the provisional map data D1 and the reference map data D2, the controller circuit 11 determines whether or not the deviation amount Z is within a predetermined reference deviation amount KZ (S14). The value of the reference deviation amount KZ can be appropriately changed and set. When the deviation amount Z is not within the predetermined reference deviation amount KZ (S14: NO), the controller circuit 11 determines that the probe data forming the provisional map data D1 are not adopted (S15), and ends this evaluation control. At this time, the controller circuit 11 may discard the probe data determined not to be adopted, that is, delete it from the probe data storage 16.

When the deviation amount Z is within the predetermined reference deviation amount KZ (S14: YES), the controller circuit 11 executes the verification process (S16). That is, the controller circuit 11 determines the pass/fail of the provisional map data D1 (i.e., a large number of probe data forming the provisional map data D1). Then, the controller circuit 11 confirms whether or not the result of the verification process is "pass" (S17). When the result of the verification process is "fail" (S17: NO), the controller circuit 11 proceeds to step S15. That is, the controller circuit 11 determines that the large number of probe data forming the provisional map data D1 are not adopted.

On the other hand, when the result of the verification process is "pass" (S17: YES), the controller circuit 11 determines that the probe data forming the provisional map data D1 are adopted (S18). The provisional map data D1 are thereby promoted to the main map data and stored in the map data storage 17. Then, the controller circuit 11 distributes the main map data stored in the map data storage 17 to the in-vehicle device 15 automatically or in response to a distribution request from the in-vehicle device 15 of the vehicle 14.

According to the probe data evaluation apparatus 10 according to the present embodiment, the controller circuit 11 generates the provisional map data D1 based on a large number of probe data collected from the in-vehicle device 15 of the vehicle 14. The generated provisional map data D1 are compared with the reference map data D2 to provide a comparison result. Based on the comparison result, it is determined whether or not to adopt the probe data. Therefore, it is possible to prevent the adoption of low-reliability probe data that generates map data D1 having a large deviation from the reference map data D2. This makes it possible to improve the reliability of the probe data used to generate the map data.

Further, according to the probe data evaluation apparatus 10, the controller circuit 11 compares the provisional map data D1 with the reference map data D2 in a state where the feature portion included in the provisional map data D1 is overlapped on the feature portion included in the reference map data D2. By performing the comparison process of both data D1 and D2 in a state where the provisional map data D1 and the reference map data D2 are overlapped with each other based on the feature portions in this way, the deviation amount Z of both data D1 and D2 can be accurately specified.

Further, according to the probe data evaluation apparatus 10, the controller circuit 11 may compare the provisional map data D1 with the reference map data D2 in a state where the plurality of feature portions included in the provisional map data D1 are overlapped on the plurality of feature portions included in the reference map data D2. By performing the comparison process of both data D1 and D2 in the state where the provisional map data D1 and the reference map data D2 are overlapped with respect to the plurality of feature portions in this way, the deviation amount Z of both data D1 and D2 can be specified with higher accuracy.

Further, according to the probe data evaluation apparatus 10, the controller circuit 11 determines the number of feature portions to be overlapped when comparing the provisional map data D1 and the reference map data D2 based on a predetermined reliability set in the probe data forming the provisional map data D1. According to this configuration, the method of overlapping the provisional map data D1 and the reference map data D2 can be determined by reflecting the reliability of the probe data. Therefore, the provisional map data D1 and the reference map data D2 can be compared in a more preferable state, and the deviation amount Z of both data D1 and D2 can be specified more accurately.

Further, according to the probe data evaluation apparatus 10, the controller circuit 11 sets the reliability of the probe data based on the traveling state data indicating the traveling state of the vehicle 14. According to this configuration, how to overlap the provisional map data D1 and the reference map data D2 can be determined by reflecting the traveling state of the vehicle 14. Therefore, the provisional map data D1 and the reference map data D2 can be compared in a more preferable state, and the deviation amount Z of both data D1 and D2 can be specified more accurately.

Further, according to the probe data evaluation apparatus 10, the controller circuit 11 sets the length of the comparison segment W for comparing the provisional map data D1 and the reference map data D2 based on the reliability of the probe data. According to this configuration, the provisional map data D1 and the reference map data D2 can be compared by dividing into road segments according to the reliability of the probe data, and the deviation amount Z of both data D1 and D2 can be specified more accurately.

Further, according to the probe data evaluation apparatus 10, when the length of the comparison segment W set based on the reliability of the probe data exceeds the predetermined length L, the controller circuit 11 sets the predetermined length L as the comparison segment W. When the comparison segment W becomes long, it becomes impossible to divide the provisional map data D1 and the reference map data D2 into small pieces and compare them. The effect of comparing the provisional map data D1 and the reference map data D2 by dividing into a plurality of segments is reduced. That is, the accuracy of the specified deviation amount Z is reduced. Therefore, by limiting the upper limit value of the comparison segment W to the predetermined length L, it is possible to prevent the accuracy of the specified deviation amount Z from being lowered.

Further, according to the probe data evaluation apparatus 10, when the controller circuit 11 determines that the probe data forming the provisional map data D1 are adopted, the controller circuit 11 further has a function of verifying the traveling of the vehicle 14 based on the provisional map data D1. According to this configuration, the map data can be generated through a plurality of stages of checks by the determination process by the determination unit 24 and the verification process by the verification unit 25. The accuracy of the map data actually delivered to the in-vehicle device 15 can be further improved.

The present disclosure is not limited to the above-described embodiment, and various modifications and extensions can be made without departing from the gist thereof. For example, the in-vehicle device 15 mounted on the vehicle 14 may be configured to function as a probe data evaluation apparatus.

Although the present disclosure has been described in accordance with the examples, it is understood that the present disclosure is not limited to such examples or structures. The present disclosure also includes various modification examples and modifications within an equivalent range. In addition, various combinations and forms, and further, other combinations and forms including only one element, or more or less than these elements are also within the sprit and the scope of the present disclosure.

The controller circuit and the method thereof described in the present disclosure may be implemented (i) by (a) a first dedicated computer provided by configuring a processor and a memory programmed to execute one or more functions embodied by a computer program product, or (ii) by (b) a second dedicated computer provided by configuring a processor with one or more dedicated hardware logic circuits, or (iii) any combination of (a) the first dedicated computer provided by configuring the processor and the memory and (b) the second dedicated computer provided by configuring the processor with one or more dedicated hardware logic circuits. The computer programs or computer program products may be stored, as instructions to be executed by a computer, in a tangible non-transitory computer-readable storage medium.

For reference to further explain features of the present disclosure, the description is added as follows.

There is a technique for generating map data based on a large number of probe data collected from a plurality of vehicles. For example, map data may be generated by performing a process such as average conversion on a large number of collected probe data.

The vehicles that provide the probe data are traveling under mutually different conditions, and also traveling on different road segments. In most cases, the large number of probe data collected are therefore generated in mutually different segments. These circumstances make it difficult to collect a sufficient number of probe data from the same segment to generate map data satisfying the required accuracy. Further, even if a large number of probe data can be collected from the same segment, in most cases, the probe data are generated in different vehicles under different traveling conditions. This also makes it difficult to collect a sufficient number of probe data generated under the same traveling conditions.

As described above, it is extremely difficult to unify the segments where probe data are generated and the traveling conditions. Therefore, the reliability of the collected probe data themselves may be low. If map data are generated based on such unreliable probe data, it is difficult to generate highly accurate map data.

It is thus desired to provide a probe data evaluation apparatus and a storage medium storing a probe data evaluation program product capable of improving the reliability of the probe data used for generating map data.

Aspects of the present disclosure described herein are set forth in the following clauses.

According to an aspect of the present disclosure, a probe data evaluation apparatus is provided to include a probe data collection unit, a provisional map data generation unit, a comparison unit, and a determination unit. The probe data collection unit is configured to collect probe data from a vehicle. The provisional map data generation unit is configured to generate provisional map data based on the probe data collected by the probe data collection unit. The comparison unit is configured to compare the provisional map data generated by the provisional map data generation unit with reference map data to provide a comparison result. The determination unit is configured to determine whether or not to adopt the probe data collected by the probe data collection unit based on a comparison result by the comparison unit.

According to another aspect of the present disclosure, a non-transitory computer-readable storage medium is provided to store a probe data evaluation program product including instructions configured to, when executed by a processor, perform a method. The method includes (i) collecting probe data from a vehicle, (ii) generating provisional map data based on the collected probe data, (iii) comparing the generated provisional map data with reference map data, to provide a comparison result, and (iv) determining whether or not to adopt the collected probe data based on the comparison result.

According to the above aspects of the present disclosure, whether or not to adopt the probe data is determined based on the comparison result between (i) the provisional map data generated from the probe data collected from the vehicle(s) and (ii) the reference map data. This makes it possible to prevent the adoption of low-reliability probe data that generates map data that deviate greatly from the reference map data. The reliability of the probe data used to generate the map data can thus be improved.

What is claimed is:

1. A probe data evaluation apparatus, including a processor and a memory for causing a computer to provide relevant functions of following configuration and units, the probe data evaluation apparatus comprising:
 a probe data collection unit configured to collect probe data including traveling state data and having a reliability set to the probe data based on a traveling state from a vehicle;
 a provisional map data generation unit configured to generate provisional map data based on the probe data collected by the probe data collection unit;
 a comparison unit configured to compare the provisional map data generated by the provisional map data generation unit with reference map data to provide a comparison result; and
 a determination unit configured to determine whether or not to adopt the probe data collected by the probe data collection unit based on the comparison result by the comparison unit,
 wherein:
 the comparison unit is further configured to
 compare the provisional map data with the reference map data in a state where a feature portion set on a road in the provisional map data is overlapped on a corresponding feature portion set in the reference map data, and
 determine a counted number of the feature portions to be overlapped when comparing the provisional map data with the reference map data, based on a predetermined reliability.

2. The probe data evaluation apparatus according to claim 1, wherein:
 the comparison unit is configured to compare the provisional map data with the reference map data in a state where a plurality of the feature portions included in the provisional map data are overlapped, respectively, on a plurality of the feature portions included in the reference map data.

3. The probe data evaluation apparatus according to claim 1, wherein:
 the probe data includes traveling state data indicating traveling states of the vehicle; and the comparison unit is configured to set the reliability, based on the traveling state data.

4. The probe data evaluation apparatus according to claim 1, wherein:
 the comparison unit is configured to set a length of a comparison segment for comparing the provisional map data and the reference map data, based on the reliability.

5. The probe data evaluation apparatus according to claim 4, wherein:
 when the length of the comparison segment set based on the reliability exceeds a predetermined length, the comparison unit is configured to set the predetermined length as the comparison segment.

6. The probe data evaluation apparatus according to claim 1, further comprising:
 a verification unit configured to verify traveling of the vehicle based on the provisional map data when the determination unit has determined that the probe data are adopted.

7. A non-transitory computer-readable storage medium storing a probe data evaluation program comprising instructions configured to, when executed by a processor, perform a method comprising:
 collecting probe data including traveling state data and having a reliability set to the probe data based on a traveling state from a vehicle;
 generating provisional map data based on the collected probe data;
 comparing the generated provisional map data with reference map data in a state where a feature portion set on a road in the provisional map data is overlapped on a corresponding feature portion set in the reference map data, to provide a comparison result, wherein a counted number of the feature portions to be overlapped when comparing the provisional map data with reference map data is determined based on a predetermined reliability set in the probe data forming the provisional map data; and
 determining whether or not to adopt the collected probe data based on the comparison result.

8. A probe data evaluation apparatus, including a processor and memory for causing a computer to provide relevant functions of following configuration and units, the probe data evaluation apparatus comprising:
 one or more processors connected with a transceiver and a storage via a communication link, the one or more processors being configured to
 collect probe data including traveling state data and having a reliability set to the probe data based on a traveling state from a vehicle using the transceiver communicating with the vehicle via a wireless communication link;

generate provisional map data based on the collected probe data;

compare the generated provisional map data with reference map data, which is stored in the memory, in a state where a feature portion set on a road in the provisional map data is overlapped on a corresponding feature portion set in the reference map data, to provide a comparison result; and determine whether or not to adopt the collected probe data based on the provided comparison result, wherein:

the one or more processors are further configured to determine a counted number of the feature portions to be overlapped when comparing the provisional map data with the reference map data, based on a predetermined reliability set in the probe data forming the provisional map data.

* * * * *